Feb. 21, 1933.　　D. L. RICHARDS　　1,898,214
LAWN AERATOR
Filed July 25, 1932
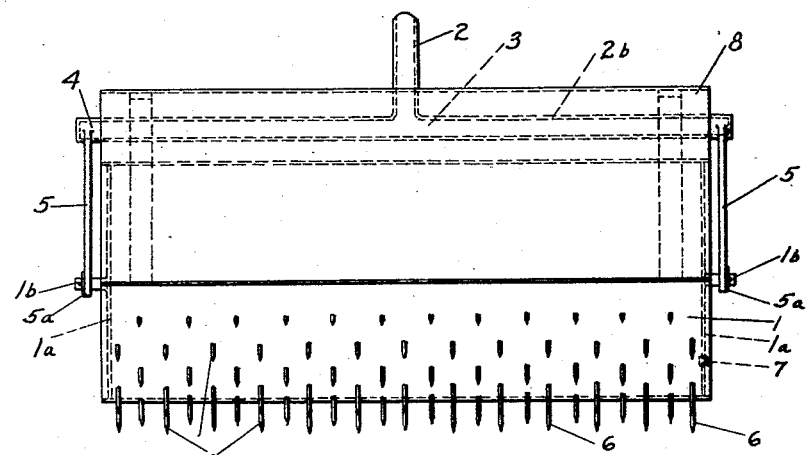
Fig. 1
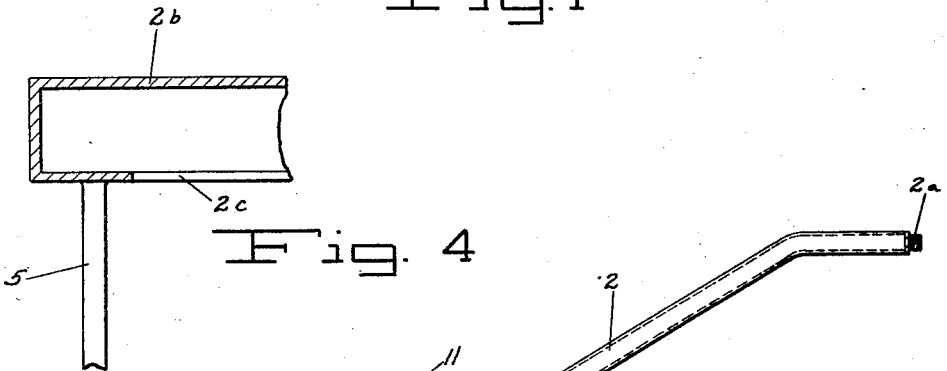
Fig. 4
Fig. 3
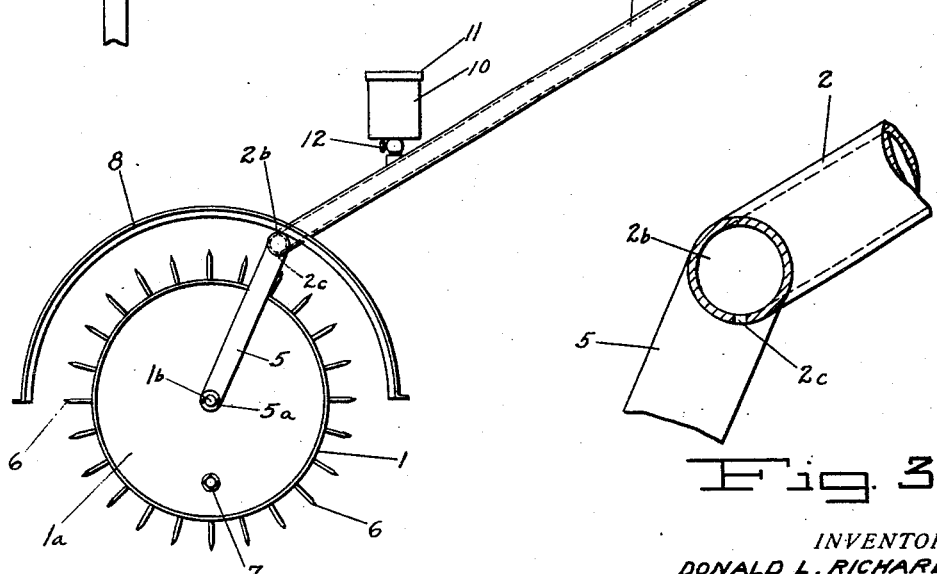
Fig. 2
INVENTOR
DONALD L. RICHARDS.
BY
ATTORNEY Patented Feb. 21, 1933

1,898,214

UNITED STATES PATENT OFFICE

DONALD L. RICHARDS, OF PORTLAND, OREGON

LAWN AERATOR

Application filed July 25, 1932. Serial No. 624,444.

My invention relates to the art of landscaping and particularly to that branch of it dealing with the propagation and maintenance of fine lawns. As is well known to landscape gardeners, aeration of soil is commonly and efficiently provided for by the earthworms who make channels through the soil, frequently coming to the surface thereof and provide for ventilation and the contact of oxygen of the air with the soil elements whereby the soil is kept sweet.

It is also well known that as the grasses used in making the better type of lawn become heavier and the resultant sod denser and thicker, earthworms will for the most part abandon the plot of ground altogether; why is unimportant when the fact is established that they do. Also when this condition has been established and the sod is very dense and thick, it is almost impervious to water, the ordinary lawn sprinkling having little effect on it since it is held up on the surface and evaporates. Sub-surface irrigation has been tried with the result that the soil gets soggy and sour and it has been determined that we cannot improve upon nature; therefore, the new invention is intended to supply the surface holes for the entrance of oxygen and moisture for irrigation. It is not claimed that it is equal to the job as done by the earthworms, but it is a step in the right direction.

A drawing accompanies and forms a part of this specification and the advantages of the invention, in view of the opening description, are self-apparent in so far as they are not specifically pointed out. In the drawing,—

Fig. 1 is a front elevation of my new aerator;

Fig. 2 is a side view looking at the right-hand end of Fig. 1;

Fig. 3 is an enlarged view of that part of Figs. 1 and 2 indicated by the numeral 3 and shown partly in section;

Fig. 4 is an enlarged view of that part of Fig. 1 indicated by numeral 4.

The device consists essentially of a drum member 1, having heads 1a, and an axis 1b, to which is attached a forked handle 2; the handle 2 is made hollow of pipe or tubing and has a hose connection at 2a, a hollow horizontal portion at 2b that is in communication with the inside of the handle 2.

On the underside of 2b is a long narrow slot or perhaps equally good a series of closely spaced small drill holes indicated by the numeral 2c, the purpose of which is hereinafter explained.

Near the ends of the element 2b are found the reach rods 5 provided with eyes 5a, or other suitable means for engaging the axis of the drum 1b so that the axis is rotatable therein; or any equivalent construction may be used so that the drum 1 is freely rotatable on its axis. The surface of the drum 1 is covered with a suitable number of small sharp spikes 6, which are preferably made of spring steel. The drum itself is preferably made of sheet metal with the heads welded in place by autogenous welding and a filler plug 7 placed in one or both of the heads so that when it is desired to use the aerator the drum may be given the desired weight by filling it with water or sand or anything else that will give it sufficient weight to discharge its function.

A housing 8 is placed over the drum 1 and may be conveniently made fast to the element 2b as shown in Fig. 2.

In order to use this device an ordinary garden hose is attached to 2a at one end and to a water supply at the other end and water under regulated pressure is supplied to 2, thence to 2b and thence through 2c it is projected with some force upon the surface of the drum 1, and by the handle 2 the operator passes the implement over the sod to be treated and it will be found that being covered with a sheet of water the spikes 6 will readily penetrate the sod and upon withdrawal as the drum revolves will leave holes in the sod according to the spacing of the teeth 6 on the drum 1, practically all of the water will go through the holes to irrigate the roots of the grass forming the sod and the holes will then remain open for the purpose of allowing the ingress of oxygen as heretofore explained and indicated as desirable.

No substantial beneficial effect will be obtained unless the drum is kept covered with a stream of water as it is being used since the spikes, however sharp, do not seem to penetrate dry turf and the situation is apparently much the same as in cutting rubber with a knife where a wet blade will cut rubber very easily and a dry one hardly at all.

The housing 8, is intended to prevent splashing of the water upon the clothing and shoes of the operator. It also concentrates an intense shower of water at the point where it will be most effective.

The main points of this invention are of course a spiked drum for penetrating the sod, the spikes being kept wet at all times while it is being used whereby the irrigation of the lawn is made much more effective and the aeration of the lawn, which is the chief object sought, is made possible by holes left in the sod notwithstanding that natural means may have failed.

An important and useful addition to this device is the receptacle, 10, having a cover, 11, connected with the handle, 2, as shown through a cock, 12, wherein liquid or water soluble fertilizer elements may be placed, the flow regulated by the cock, 12, and an even distribution of fertilizer well diluted with water may take place over the surface of the lawn being processed.

Wide variations are possible in constructing this device and I therefore do not limit myself to the exact construction disclosed; but claim, together with the range of equivalents to which I may be justly entitled.

I claim:

1. A lawn aerator defined in part as a drum member, spikes on the tread surface of said drum member, mountings for the drum member, a semi-housing for said drum member, a water distribution pipe lengthwise of the drum member and under the said semi-housing and a water supply connection for said distribution pipe.

2. In a lawn aerator, a spiked surface drum, mountings for said drum effective to permit its being rolled over a lawn surface a hollow handle for said mountings, a water connection for said handle, a water distribution pipe in communication with said handle and an opening in said water distribution pipe, whereby water is distributed in substantial uniformity over the surface of the drum as it is rolled over the surface of a lawn.

3. A lawn aerator defined in part as a hollow drum, means for loading the interior of the drum, spikes covering the surface of the drum and projecting radially therefrom, a water distribution pipe over the drum and in substantial parallelism with the axis thereof, an opening on the water distribution pipe for uniform distribution of water over the surface of the drum and a hollow handle whereby water is conveyed to the water distribution pipe.

4. The structure as defined in claim 3 and including a receptacle for liquid fertilizer with means for regulated mixture of its contents with the water supply.

5. A lawn aerating device consisting essentially of a weighted drum having a plurality of lawn penetrating spikes on the surface thereof, water supply devices in connection therewith whereby a supply of water is delivered to the spikes when they are rolled over and with their points in contact with a lawn, means for supplying diluted liquid fertilizer to the spikes with the water supply and means for manual propulsion of the drum over the surface of a lawn.

6. The structure as claimed in claim 5 and including a semi-housing for the drum to prevent splashing.

In witness whereof I have affixed my signature.

DONALD L. RICHARDS.